US006891564B2

(12) United States Patent
Fujimori et al.

(10) Patent No.: US 6,891,564 B2
(45) Date of Patent: May 10, 2005

(54) CUTOFF CONTROL WITH ON SCREEN DISPLAY CIRCUIT FOR ADJUSTING WHITE BALANCE

(75) Inventors: Shin Fujimori, San Diego, CA (US); Hiyouki Nakazono, Kanagawa (JP); Toshinori Hamada, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 530 days.

(21) Appl. No.: 10/012,199

(22) Filed: Dec. 5, 2001

(65) Prior Publication Data

US 2003/0103143 A1 Jun. 5, 2003

(51) Int. Cl.[7] .................................................. H04N 3/20
(52) U.S. Cl. ....................... 348/173; 348/380; 348/569; 345/867
(58) Field of Search ................................ 348/173, 177, 348/189, 377, 380, 569, 655, 656, 225.1; 345/589, 592, 867

(56) References Cited

U.S. PATENT DOCUMENTS 4,435,729 A    3/1984  Harwood et al.
5,677,730 A  * 10/1997 Park ............................ 348/173
5,920,339 A  *  7/1999 Lee ............................. 348/173
6,242,863 B1    6/2001 Amaya et al.

OTHER PUBLICATIONS

PCT International Search Authority; "Notification of Transmittal of the International Search Report or the Declaration" and "PCT International Search Report"; dated May 1, 2003; 5 pages.

* cited by examiner

Primary Examiner—Victor R. Kostak
(74) Attorney, Agent, or Firm—Thomas P. Lebens; Fitch, Even, Tabin & Flannery

(57) ABSTRACT

An apparatus for controlling aging, cathode ray tube aging including a microcontroller generating brightness level data for aging of the cathode to a video input signal; a video preamplifier connected to the microcontroller receiving the brightness level data by the video input signal and mixing a host video signal to generate a video output signal wherein the brightness level of the video output signal being controlled by the microcontroller; a cutoff control coupled to the video preamplifier receiving brightness data of the video output signal and setting a proper brightness level of a cathode; and a voltage control not coupled to the microcontroller preset for a an initial brightness level of the cathode during aging.

19 Claims, 5 Drawing Sheets

CUTOFF CONTROL WITH ON SCREEN DISPLAY CIRCUIT FOR ADJUSTING WHITE BALANCE

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of video display devices, and more particularly to on-screen display circuits and cutoff control circuits for adjusting the white balance of displayed devices to control the brightness level during aging.

BACKGROUND OF THE INVENTION

In a display device, such as a monitor, a white balance adjustment makes a white object appear white, regardless of the color temperature. In particular, in a cathode ray tube (CRT), a white balance adjustment adjusts gains and biases of signals applied to red, green and blue (RGB) guns or cathodes in the CRT. This bias adjustment is often referred to as a cutoff adjustment. Cutoff control circuits can employ a DC coupling or an AC coupling when driving the cathodes of the CRTs.

A common concern is that the brightness control depends on a combined RGB signal, but the cutoff control, which controls cathode biases, is carried out for each of the RGB signals separately. In order to adjust the white balance, the brightness level is adjusted first, and then the cut-off control is performed.

FIG. 1 is a circuit diagram of a related control circuit, having a G2 control 60. The G2 control may be a varister or variable resistor control circuit being controlled by the video pre-amplifier mixer 20. The G2 control can generate a flat field test pattern for variable picture level control. The control circuit of FIG. 1 includes a video pre-amplifier 20, a microcontroller 10, an I²C bus, an OSD controller 30, a deflection circuit 70, a video amplifier 40, a cutoff control circuit 50. The video preamplifier OSD mixer 20 and a video amplifier 40 output a mixed video signal to the CRT. The G2 control sets the voltage of the cathode at the CRT. The G2 control is coupled to the video pre-amplifier OSD mixer 20 and to a cathode (not shown) in a CRT. The G2 control operation is controlled by voltage control data generated by the microcontroller 10. The microcontroller 10, which receives a horizontal sync and a vertical sync generates horizontal sync and vertical sync pulses to a deflection circuit 70. Also the microcontroller 10 is coupled to the I²C bus enabling the microcontroller to send data parameters of picture size, OSD picture, OSD image, scaling parameters, image data associated with the input signal to the video preamplifier OSD mixer 20. Further, FIG. 1 shows a color video system having three channels (RGB). The cutoff controller adjusts the respective CRT cathode bias voltages for the CRT for each of the respective RGB cathodes.

The OSD 30 function operates based on information from the microcontroller 10. The OSD may include standard microprocessor circuitry, for example, the MC141544DW microprocessor manufactured by Motorola. A detailed specification of the unit "MC141544DW" is made or described in the *Semiconductor Technical Book, Revision* 0.0, Feb. 28, 1997, *published by Motorola Company*. The OSD device functions in accordance with the preamplifier OSD mixer 20, defection circuit 70, video amplifier 40 and cutoff control 50.

The video preamplifier 20 amplifies the analog video signals of red (R), green (G), and blue (B), colors applied from a host device thereto. The amplified analog R, G, B video signals are applied to associate analog to digital converters (not shown), included in the video preamplifier OSD mixer. The microcontroller 10 receives horizontal and vertical synchronizing signals h-synch and v-synch from a host (not shown), thereby outputting vertical and horizontal synchronizing signals having specific polarities respectfully. For instance, where the CRT apparatus has operation characteristics to be synchronized with the vertical and horizontal synchronizing signals of a negative polarity, it generates negative horizontal and vertical synchronizing signals respectfully.

The microcontroller 10 also may determine the video resolution commonly supported by a host by detecting respective frequencies of the analog, horizontal and vertical synchronizing signals, h-sync, and v-sync. After this determination, the microcontroller 10 sends associate information to the I²C bus.

Further, FIG. 1 shows the monitor block diagram having a G2 control 60 where the G2 control consists of an amplifier and buffer circuit (not shown). The microcontroller 10 determines the voltage of the G2 control through the I²C bus, a D/A converter converts the video signal to an analog signal to the preamplifier 20.

Hence, the OSD circuit generates RGB video signals synchronized with the horizontal sync and vertical sync, generated by the microcontroller 10. The video pattern is controlled by the microcontroller 10 through the I²C bus. The video preamplifier circuit receives both the external RGB video signal and the RGB OSD video signal. After mixing the RGB video signal and the RGB OSD video signal, the preamplifier 20 outputs an RGB video signal to control the AC factor of the video signal, which is dependent on the mixed video signals. Further, the preamplifier 20 outputs the RGB cutoff voltage to control the DC factor of the video signal. This RGB cutoff voltage is controlled by the microcontroller 10 through the I²C bus.

FIG. 2A describes a flowchart of a related configuration of the CRT aging adjustment process. At 210, the microcontroller 10 generates the horizontal synchronous and vertical synchronous signals; at step 220 the size, position and distortion of the background picture rasters are set; at step 230 the initial aging conditions of the RGB OSD video signal are set up, and finally step 240, the microcontroller sets the initial beam current level for the G2 control for the initial aging conditions.

Accordingly, as shown in the flow chart of FIG. 4B initially there is a configuration of aging, step 500. The automatic brightness limiter circuit (hereinafter "ABL" circuit) (not shown) is designed to limit the beam current. When a picture image of high brightness is displayed, it sharpness decreases because of size of the beam spot in a CRT over a high brightness area increases, and at the same time the beam current increases at the high brightness area. If the beam exceeds the effective electron emission amount of the cathode, the life of the CRT is shortened. For this reason the television receiver is provided with an ABL circuit for limiting the beam current. The microcontroller along with setting the size, position and distortion of the picture or background of the picture desired measures the ABL voltage at step 510. If the ABL voltage is higher than expected, step 520, then the G2 voltage is lowered, step 530, to compensate for the higher ABL voltage. Also, if the ABL voltage as measured by the microcontroller is lower than expected, step 540, than the G2 voltage is increased step 550 to compensate for the lower than expected ABL voltage. Hence, the G2 control serves to balance the ABL voltage during aging.

Under present day technology the video circuit can be manufactured at a lower cost by discrete circuit construction and therefore the ABL circuit is more expensive and complicates the video amplifier.

Hence, there remains a need for an automatic brightness control system during aging that is simple in structure and easy to manufacture.

SUMMARY OF THE INVENTION

An object of the present invention is to provide an on-screen-display OSD for controlling a cutoff circuit which in turn limits the beam current. The present invention provides an OSD circuit for receiving an RGB cutoff signal parameters and generating an RGB OSD video signal; a video mixer for receiving an RGB video signal and an RGB OSD video signal, mixing the RGB video signal and the RGB OSD video signal generating a mixed RGB cutoff signal; a cutoff circuit coupled to a CRT receiving the mixed RGB cutoff signal to adjust the brightness level of the CRT for aging whereby the mixed RGB cutoff signal including a brightness component to set the brightness of the CRT during aging.

Further, in another embodiment the present invention provides an apparatus for controlling aging, comprising: a microcontroller generating brightness level data for aging of the cathode to a video input signal; a video preamplifier connected to the microcontroller receiving the brightness level data by the video input signal and mixing a host video signal to generate a video output signal wherein the brightness level of the video output signal being controlled by the microcontroller; a cutoff control coupled to the video preamplifier receiving brightness data of the video output signal and setting a proper brightness level of a cathode; and a voltage control not coupled to the microcontroller preset for a an initial brightness level of the cathode during aging.

Still, in another embodiment the present invention provides a method for controlling aging, comprising: generating using a microcontroller brightness level data for aging of the cathode to a video input signal; receiving brightness level data by a video preamplifier connected to the microcontroller and mixing a video input signal and a host video signal to generating a video output signal wherein the brightness level of the video output signal being controlled by the microcontroller; receiving brightness data of the video output signal to a cutoff control coupled to the video preamplifier and setting a proper brightness level of a cathode; and presetting a voltage control not coupled to the microcontroller for a an initial brightness level of the cathode during aging.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWINGS

The following detailed description, given by way of example, and not intended to limit the present invention solely thereto, will best be understood in conjunction with the accompanying drawings in which.

Use of the same reference symbols in different figures represent indicate similar or identical items.

DETAILED DESCRIPTION OF THE INVENTION

While the present invention has been particularly shown and described with reference to a preferred embodiment(s), it will be understood that various changes and modifications may be made without departing from the spirit and scope of this invention. It is intended that the appended claims be interpreted to cover the embodiments described herein and all equivalents thereto.

Figure 3:
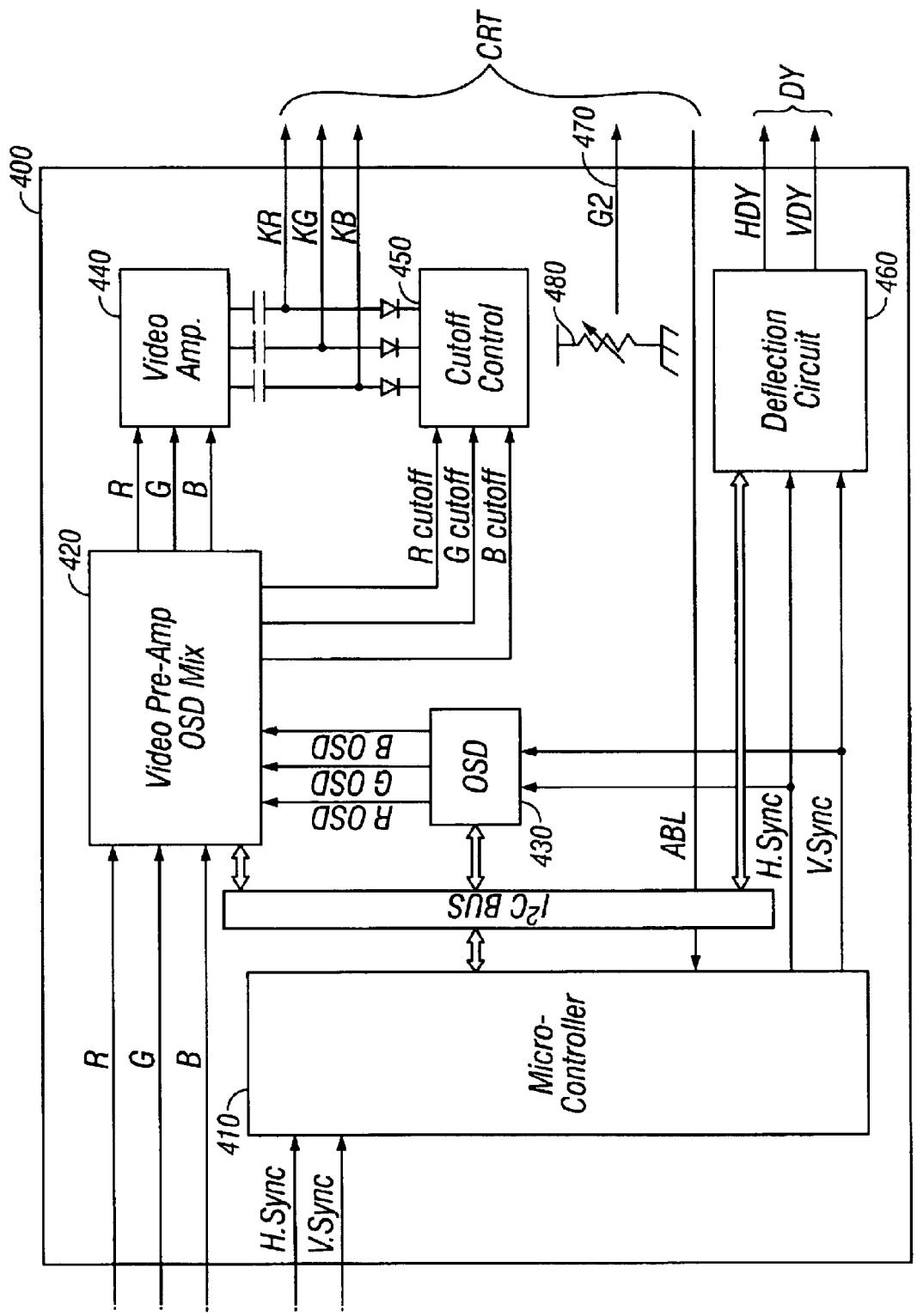
FIG. 3 illustrates a block diagram of a monitor display of a preferred embodiment according to the present invention.

FIG. 3 shows a monitor display circuit in accordance with an embodiment of the invention. The monitor display circuit includes a microcontroller 410 coupled via an I$^2$C bus to an OSD circuit 430, to a video preamplifier OSD mixer 420, and subsequently coupled to a video amplifier 440. The video preamplifier OSD mixer 420 is coupled to both the video amplifier 440 and a cutoff control circuit 450. A video preamplifier OSD mixer 420 amplifies analog video signals of red (R), green (G), and blue (B) colors which are applied from the host to the video preamplifier OSD mixer 420. The amplified analog RGB along with the video signals are applied to a series of analog to digital converters (not shown). A host device also sends horizontally synchronous and vertical synchronous signals to the microcontroller 410 which in turn sends these synchronizing signals to the CRT display. A host may include a central processing unit, a hard disk, a floppy disk drive and a video board, and the like. The video preamplifier OSD mixer 420 converts the input analog signals into corresponding digital signals, which are in turn applied to the CRT. Further based upon the digital signals, the video amplifier 440 acts as a drive amplifier to display a corresponding image on the screen of the CRT.

The I$^2$C bus conveys serial control data from the microcontroller 410 to the OSD device 430 and may also store data in an internal register for output as a parallel signal. Should an 8-bit parallel data signals be used, a cutoff level for an R, G or B cathode in the CRT can be indicated by the parallel signal. A deflection circuit 460 is coupled via the I$^2$C bus to the microcontroller 410. The microcontroller 410, video preamplifier OSD mixer 420 and OSD 430 can be formed on an integrated circuit IC. The microcontroller or the OSD 430 through the video signal generates brightness control signals to indicate the desired brightness level of the CRT image. Further, the OSD 430 receives other inputs from the I2C bus including such parameters are the picture size, scaling factors, and threshold data.

A G2 control 470 is preset to control the cathode bias voltage of the RGB cathodes of the CRT so as to output a predetermined brightness control voltage. The G2 control is not coupled to the video preamplifier OSD mixer 420, therefore, the size of the beam current is not modulated by the G2 control but is preset to a threshold amount giving a particular high brightness. This eliminates the need for the ABL with the G2 control to control the brightness level, since the cutoff control 450 now sets the threshold values of the RGB signal and can be lowered or raised depending on the ABL voltage.

The microcontroller 410 receives horizontal and vertical synchronizing signals, v-sync and h-sync from the host, thereby outputting vertical and horizontal synchronizing signals having specific polarities respectfully. For instance where the CRT monitor has operation characteristics to be synchronized with the vertical and horizontal synchronizing signals of a negative polarity, the microcontroller generates negative horizontal and vertical synchronizing signals, h-negative and v-negative, respectfully. The microcontroller also determines the video resolution supported by the host by detecting respective frequencies of the analog horizontal and vertical synchronizing signals, h-sync and v-sync. After this determination, the microcontroller 410 would send associated information via the I²C bus. The microcontroller 410 also sends OSD information, such as the position of the OSD picture, or OSD image, via the I²C bus. The OSD driver 430 operates in sync with the OSD clock (not shown) based upon data from the microcontroller 410. The OSD driver converts data stored in the internal character ROMS into an OSD video signal (OSD-RGB), which in turn is applied to the video preamplifier mixer 420.

Accordingly, an OSD picture is displayed in a corresponding portion of the screen of the CRT. The OSD display function can be used in the following cases. The OSD, for example, can generate a white test pattern so as to obtain sufficient luminescence range for the CRT. Such a luminance range would be proportionateley RGB. The test pattern generated by the OSD 430 device is sent to a video preamplifier 420 and mixed with a main video signal RGB. The video preamplifier OSD mixer 420 can control the gain of the white test pattern generated by the OSD device 430 from data from the microcontroller 410. For example, should higher luminance be required, a greater quantity of the white pattern can be generated by the OSD device 430.

Figure 1:
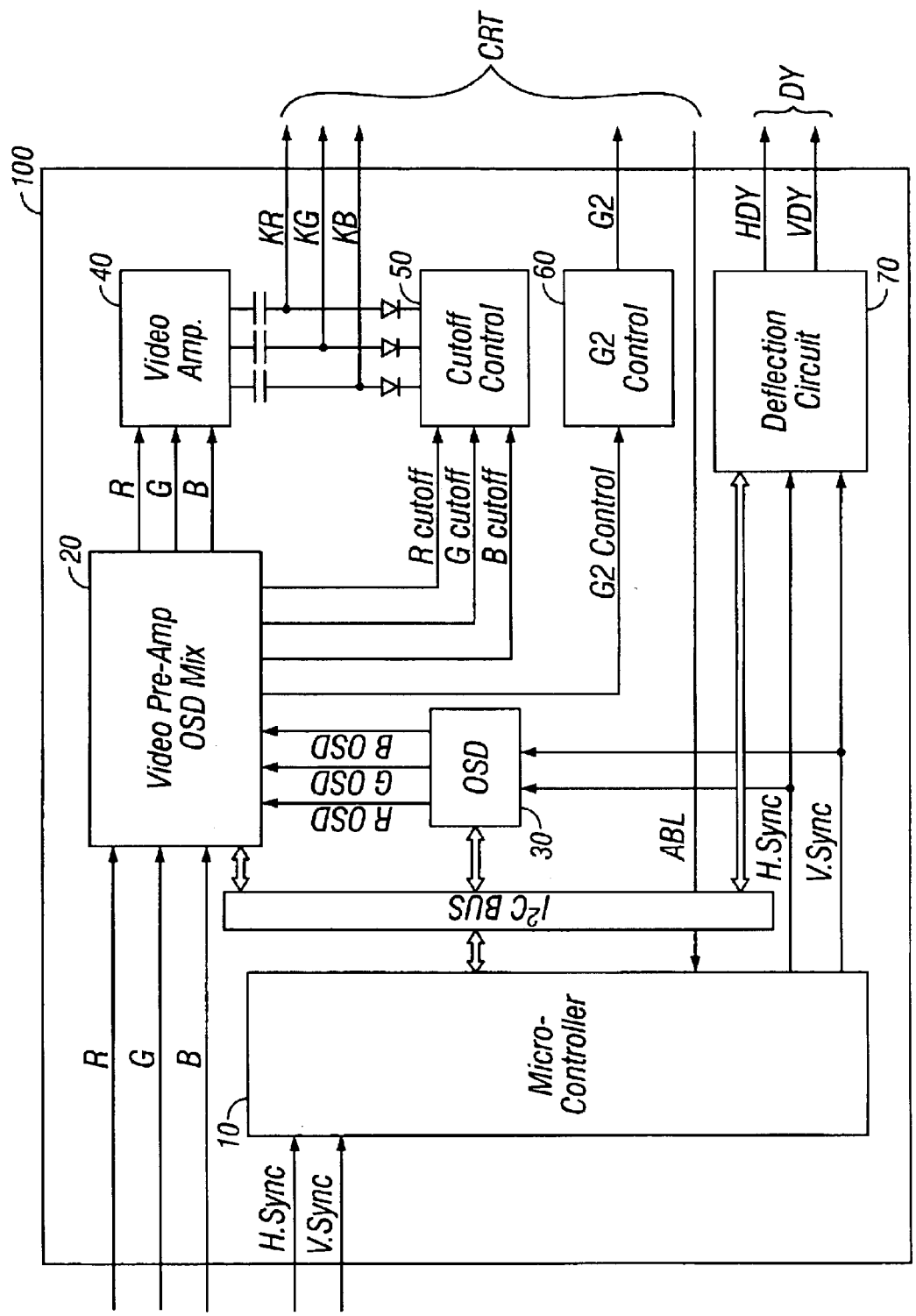
FIG. 1 illustrates a related diagram of a monitor display.
Figure 2A:
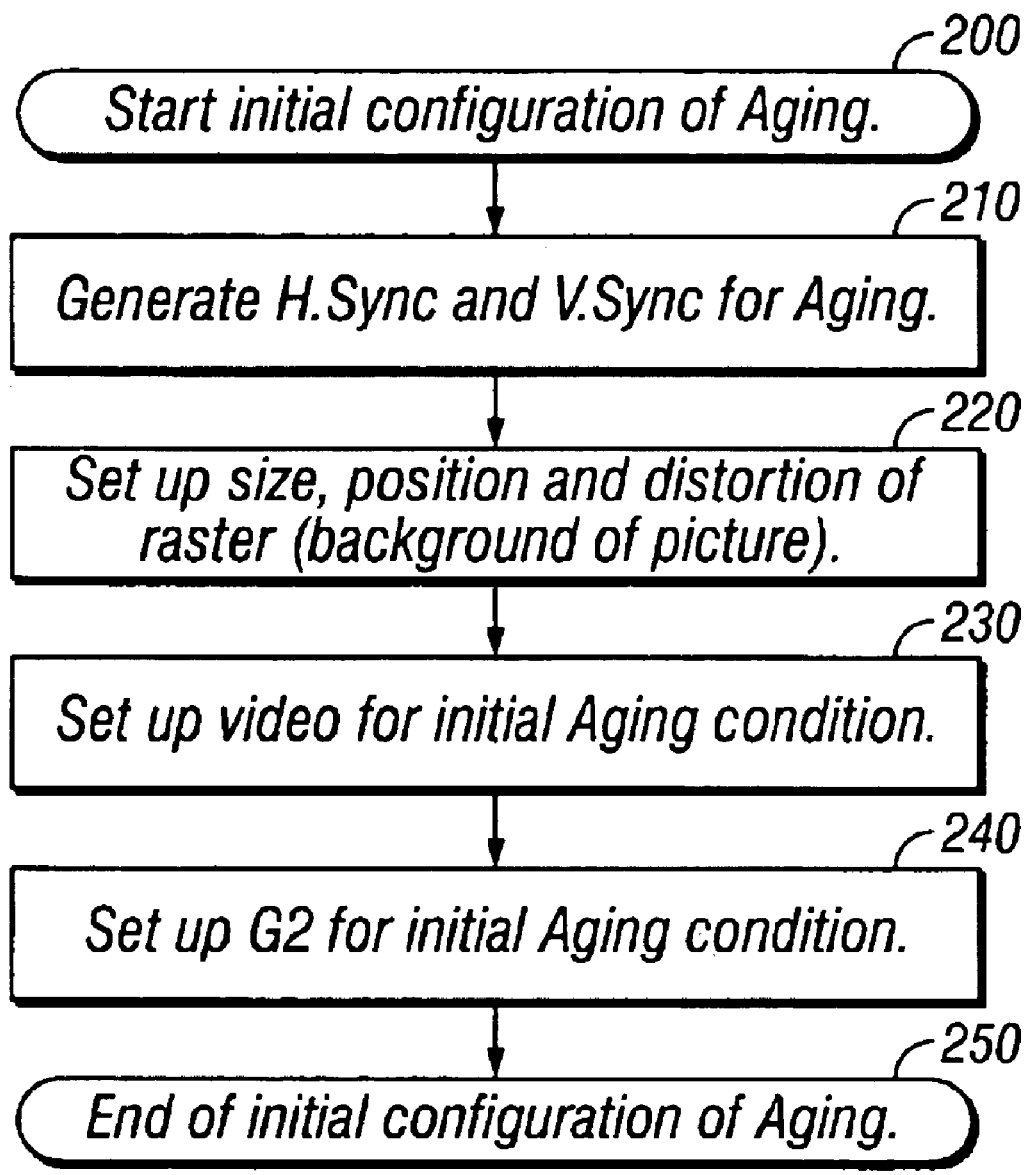
FIG. 2A illustrates a flowchart of a related art cutoff control system.
Figure 2B:
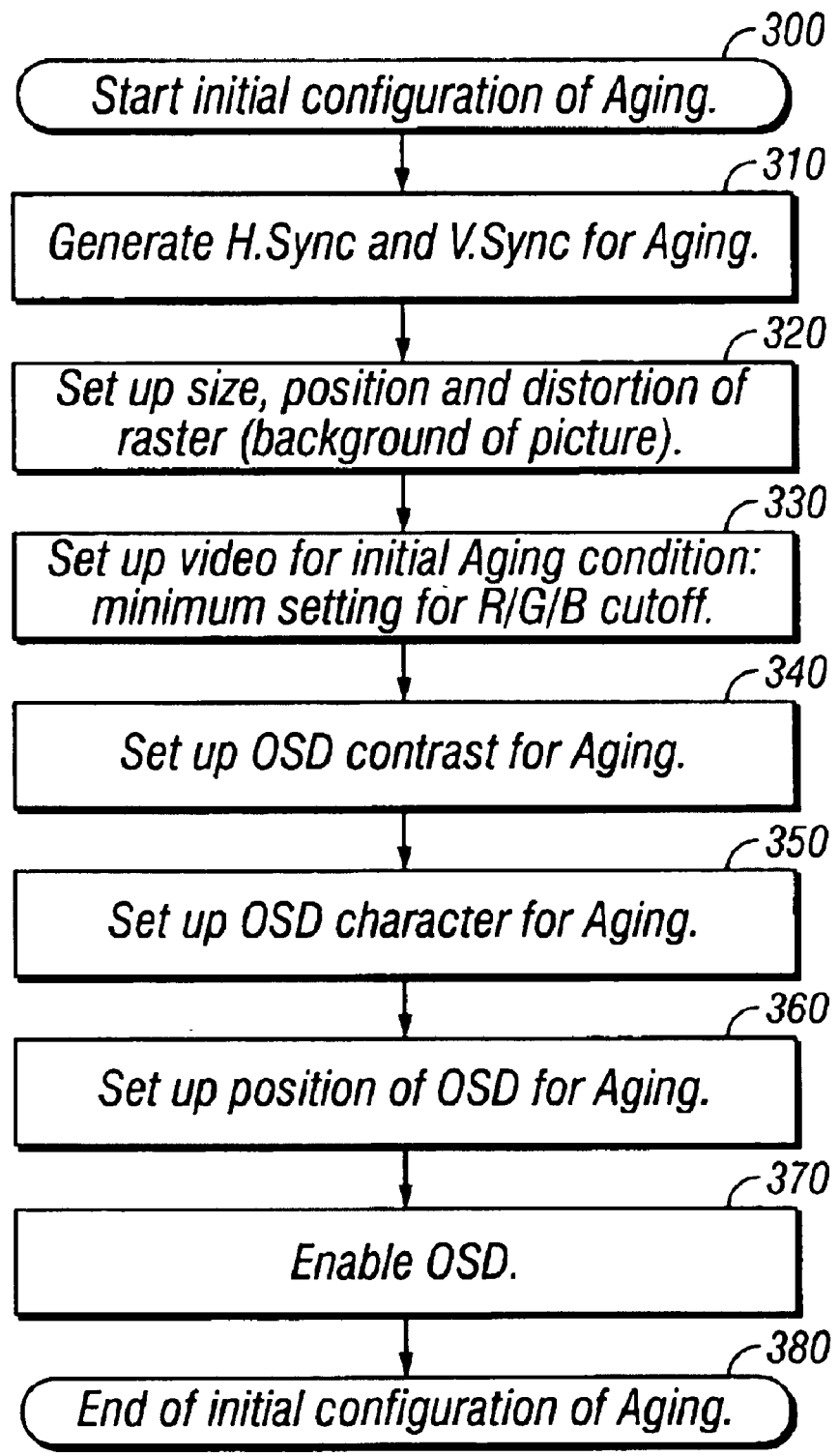
FIG. 2B is a flowchart of a cutoff control system of a preferred embodiment according to the present invention.

Turning to the flowchart of FIG. 2B, the initial configuration steps of the OSD device 430 for the aging process are described. Step 300 the initial configuration is set. At step 310 the horizontal and vertical synchronizing signals are generated from the host and subsequently sent to the OSD device. At step 320, the size, position, distortion rate of the rasters are set for the OSD device. These parameters are generated from the microcontroller and can be determined from the CRY type as well are other data received. At step 330 the initial aging conditions for the RGB cutoff circuit 450 (of FIG. 3) are set up so a minimum brightness level which is dependent on the combined composite RGB signal are set by controlling the cutoff circuit settings of the cathode biases. Steps 340, 350, and 360 set up the contras, character and positions for the OSD aging. At step 370, the OSD is enabled.

Further, the G2 control controls variations in the CRT bias cathode voltages by being preset to an offset voltage determined by the make and model of the CRT. The present G2 control 480 is limited in range to the size of the variable resistor used to limit the beam current. The G2 control is one grid of an electron gun on the CRT. Therefore, usually DC voltage is applied, each CRT requires a suitable DC voltage to be applied. Hence, there is a DC amplifier controlled by a microcontroller for the G2 control.

Therefore, because of the limited range of the G2 controller, it is necessary to use the cutoff control for further luminance control during aging.

Figure 4A:
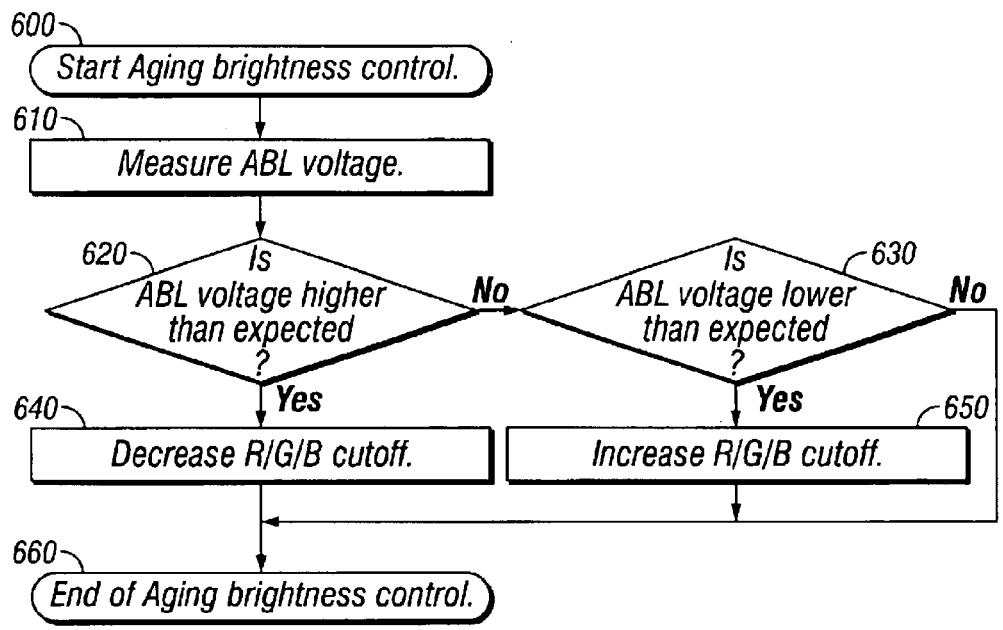
FIG. 4A illustrates a cutoff control flowchart of a related embodiment according to the present invention.
Figure 4B:
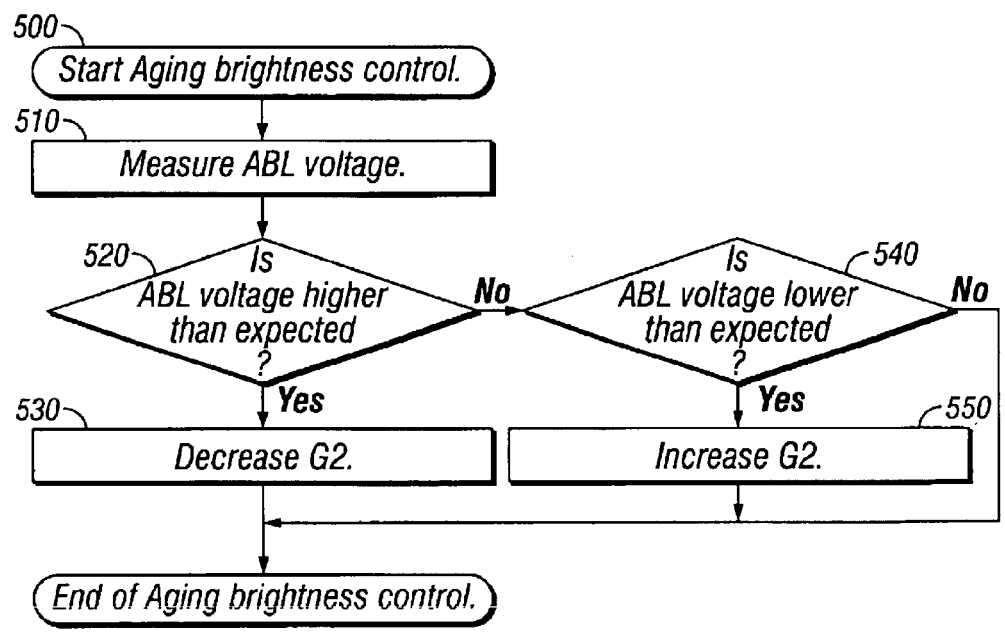
FIG. 4B illustrates a cutoff control flowchart of a preferred embodiment according to the present invention.

FIG. 4A describes control of the ABL voltage (Automatic Brightness Limiter) where the composite video signal is reduced depending on the output voltage of the ABL circuit to lower the white level of the composite video signal, while keeping the overall tone unchanged from preventing an excess beam current from flowing without losing the half tone. The ABL circuit 620 depicts changes in the beam current to produce an output signal when the beam current exceeds a predetermined level. For example, the purpose of reducing the amplitude of a signal i.e. preventing excess beam current, when the amplitude of a brightness signal in the composite video signal decreases is to balance the brightness of the displayed picture image with the color saturation.

Accordingly, in the flow diagram of FIG. 4A, an aging brightness control is determined at step 600. The ABL is measured at step 610 and if the ABL voltage is higher than expected step 620, then the strength of the beam current is decreased by the RGB cutoff control at step 640. Alternately, if the strength of the beam current is lowered than expected than there is needed an increase in the RGB cutoff at step 650 proceeding to the aging brightness control ending at step 660.

By controlling the beam current, the affected electron emission amount of the cathode is reduced so that the life of the CRT is extended. Also, if excess anode current flows exceeds a maximum allowable current of the high voltage rectifier element in the CRT, it can result in breakage of elements and again a shortened life span of the CRT.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. An on-screen-display OSD for controlling a cutoff circuit, comprising:
    an OSD circuit for receiving an RGB cutoff signal parameters and generating an RGB OSD video signal;
    a video mixer for receiving an RGB video signal and the RGB OSD video signal, mixing the RGB video signal and the RGB OSD video signal generating a mixed RGB cutoff signal;
    a cutoff circuit coupled to a CRT receiving the mixed RGB cutoff signal to adjust the brightness level of the CRT for aging whereby the mixed RGB cutoff signal includes a brightness component to set the brightness of the CRT during aging; and
    a variable control not coupled to the video mixer for setting a threshold brightness level of the CRT.

2. The apparatus according to claim 1, wherein the variable control comprises a variable resistor adjusted to a preset brightness level.

3. The apparatus according to claim 1, further comprising:
    a microcontroller device for generating said RGB cutoff signal parameters.

4. An on-screen-display OSD for controlling a cutoff circuit, comprising:

an OSD circuit for receiving an RGB cutoff signal parameters and generating an RGB OSD video signal;

a video mixer for receiving an RGB video signal and the RGB OSD video signal, mixing the RGB video signal and the RGB OSD video signal generating a mixed RGB cutoff signal;

a cutoff circuit coupled to a CRT receiving the mixed RGB cutoff signal to adjust the brightness level of the CRT for aging whereby the mixed RGB cutoff signal includes a brightness component to set the brightness of the CRT during aging; and a microcontroller device for generating said RGB cutoff signal parameters;

wherein said parameters generated by the microcontroller including raster size, raster shape and raster distortion.

5. The apparatus according to claim 4, wherein the microcontroller presets the OSD device for aging.

6. An on-screen-display OSD for controlling a cutoff circuit, comprising:

an OSD circuit for receiving an RGB cutoff signal parameters and generating an RGB OSD video signal;

a video mixer for receiving an RGB video signal and the RGB OSD video signal, mixing the RGB video signal and the RGB OSD video signal generating a mixed RGB cutoff signal;

a cutoff circuit coupled to a CRT receiving the mixed RGB cutoff signal to adjust the brightness level of the CRT for aging whereby the mixed RGB cutoff signal includes a brightness component to set the brightness of the CRT during aging; and a microcontroller for sending RGB parameters via a bus to the OSD device configuring the CRT during aging, wherein the RGB parameters include raster size, position and distortion.

7. The apparatus according to claim 6, further comprising:

the microcontroller initializing a contrast setting of the OSD circuit.

8. The apparatus of claim 6, further comprising:

the microcontroller initializing a character setting of the OSD circuit.

9. The apparatus of claim 6, further comprising:

the microcontroller initializing a position setting of the OSD circuit.

10. An apparatus for controlling aging, comprising:

a microcontroller generating brightness level data to a video input signal for aging of the cathode ray tube;

a video preamplifier connected to the microcontroller receiving the brightness level data by the video input signal and mixing a host video signal to generate a video output signal wherein the brightness level of the video output signal being controlled by the microcontroller;

a cutoff control coupled to the video preamplifier receiving brightness data of the video output signal and setting a proper brightness level of a cathode; and a voltage control not coupled to the microcontroller preset for an initial brightness level of the cathode during aging.

11. The apparatus according to claim 10, further comprising:

a bus connector receiving brightness data from the microcontroller and connected to at least the video preamplifier.

12. The apparatus according to claim 11, further comprising:

a drive amplifier connected to the video preamplifier to amplify the video output signal to the cathode.

13. The apparatus according to claim 10, further comprising:

the microcontroller generating a test pattern for controlling the video preamplifier wherein the test pattern setting the brightness level of the mixed output video signal.

14. The apparatus according to claim 10, further including:

the microcontroller, video preamplifier, and OSD being formed on a single IC package.

15. The apparatus according to claim 12, further comprising:

a deflection device connected via the bus connector to at least the microcontroller receiving synchronized horizontal and vertical signals.

16. A method for controlling aging, comprising:

generating using a microcontroller brightness level data for aging of the cathode to a video input signal;

receiving brightness level data by a video preamplifier connected to the microcontroller and mixing a video input signal and a host video signal to generating a video output signal wherein the brightness level of the video output signal being controlled by the microcontroller;

receiving brightness data of the video output signal to a cutoff control coupled to the video preamplifier and setting a proper brightness level of a cathode; and presetting a voltage control not coupled to the microcontroller for an initial brightness level of the cathode during aging.

17. The method according to claim 16, further comprising:

generating a test pattern using the microcontroller for controlling the video preamplifier wherein the test pattern setting the brightness level of the mixed output video signal.

18. The apparatus according to claim 16, further including:

forming on a single IC package the microcontroller, video preamplifier, and OSD.

19. An apparatus for controlling aging, comprising:

a microcontroller means for generating brightness level data for aging of the cathode to a video input signal;

a video preamplifier means connected to the microcontroller means receiving the brightness level data by the video input signal and mixing a host video signal to generate a video output signal wherein the brightness level of the video output signal being controlled by the microcontroller means;

a cutoff control means coupled to the video preamplifier means receiving brightness data of the video output signal and setting a proper brightness level of a cathode; and a voltage control means not coupled to the video preamplifier means preset for a an initial brightness level of the cathode during aging.

* * * * *

UNITED STATES PATENT AND TRADEMARK OFFICE
CERTIFICATE OF CORRECTION

PATENT NO. : 6,891,564 B2
DATED : May 10, 2005
INVENTOR(S) : Fujimori et al.

It is certified that error appears in the above-identified patent and that said Letters Patent is hereby corrected as shown below:

Column 8,
Line 63, delete "a".

Signed and Sealed this

Twenty-ninth Day of November, 2005

JON W. DUDAS
*Director of the United States Patent and Trademark Office*